March 9, 1948. C. H. FOULKES Re. 22,982

MECHANICAL ADJUSTMENT OF ELEMENTS MOUNTED INSIDE VACUUM TUBES

Original Filed Aug. 16, 1943

Inventor
Christopher Henry Foulkes.
By
Attorney

Reissued Mar. 9, 1948

Re. 22,982

UNITED STATES PATENT OFFICE 22,982

MECHANICAL ADJUSTMENT OF ELEMENTS MOUNTED INSIDE VACUUM TUBES

Christopher Henry Foulkes, London, England, assignor to Standard Telephones and Cables Limited, London, England, a British company Original No. 2,368,821, dated February 6, 1945, Serial No. 498,802, August 16, 1943. Application for reissue February 5, 1947, Serial No. 726,714. In Great Britain November 26, 1942

7 Claims. (Cl. 250—27.5)

The present invention relates to means for adjusting from the outside electrodes or other elements mounted inside vacuum or gas-filled tubes.

It frequently happens that a member or element fixed inside a tube is required to be adjusted from time to time as regards its position with respect to other elements. There are considerable difficulties in devising any satisfactory mechanical adjustment from outside and which at the same time will not cause a deterioration of the vacuum (or changes in pressure in a gas-filled tube). Magnetic means are of course known for adjusting elements inside tubes but these are not always practicable and generally lack precision.

In the present invention the difficulties are overcome by providing an arrangement for adjusting the position of an element mounted inside a vacuum or gas-filled tube comprising an elastic metal pipe sealed through the envelope of the tube with a gas-tight seal and extending outside the tube, and a metal rod which passes through the pipe into the envelope and is secured to the pipe only at the extremity of the external extension making a gas-tight joint therewith.

The invention will be described with reference to the accompanying drawing, in which.

It will be understood that the problem is the same whether the tube concerned is exhausted or is filled with gas at some prescribed pressure, and accordingly the term "tube" will be used in this specification to signify a vacuum tube or a gas-filled tube.

Figure 1:
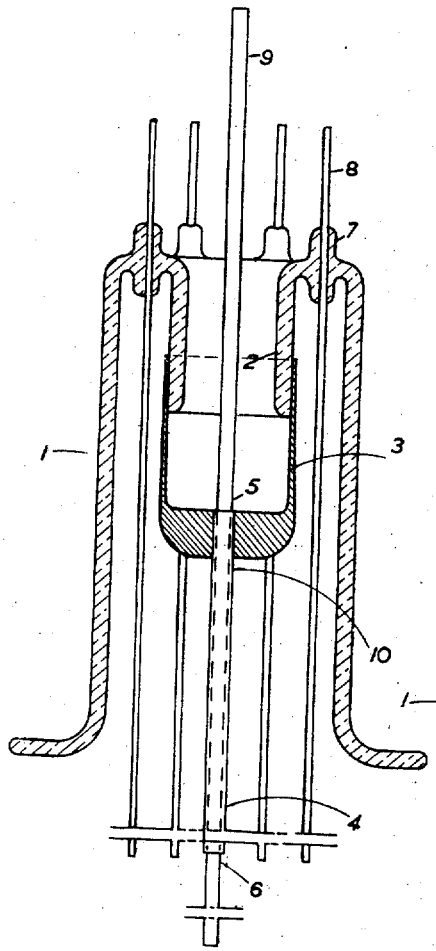
Figure 1 is a vertical central section through one embodiment.

Fig. 1 shows the stem portion 1 of a tube which portion will ultimately be sealed to the remainder of an appropriate bulb or envelope, not shown. This stem is preferably made of a lead glass and comprises a re-entrant portion 2 to which is sealed a copper cup member 3 having a feathered edge adapted for sealing to the glass according to well known principles. Through the base of the cup is soldered at 10 a thin elastic metal pipe 4. A slightly smaller metal rod 5 of any length passes through the pipe 4 and through the cup 3 into the envelope and is soldered to the pipe at the outer end 6 only. The two soldered joints should, of course, be gas-tight and are preferably made with silver solder.

The upper annular ridge of the stem 1 carries any number of the usual seals 7 for conveying the leads 8 through the stem to the electrodes or other conductors (not shown) inside the tube.

The pipe 4 is preferably constructed of a copper-nickel alloy containing 20% of nickel and may be, for example, 0.065" in internal diameter and 0.005" thick. The rod 5 is preferably of steel, 0.062" in diameter, for example. The pipe 4 made in this way will be sufficiently elastic to enable the rod 5 to be rotated through a reasonably large angle with respect to the stem, without damaging the joints or impairing the efficiency of the seals. The pipe must not, of course, be strained beyond the elastic limit, but it has been found, for example, that if the portion of the pipe 4 which extends outside the envelope is 4 inches long, the rod 5 may be rotated through 15 degrees on either side of the mean position, and may be operated hundreds of times without any sign of loss of vacuum or pressure. It will be evident that the permissible angle of rotation can be increased if desired by suitably designing the parts, for example, by lengthening the pipe 4, or in other ways.

The inner end of the rod 5 is suitably connected to the element (not shown) which has to be adjusted inside the envelope. This element might, for example, be the rotating vanes of a condenser, or any other device which has to be rotated. It will be understood, however, that the rod 5, by means of a suitable mechanical linkage, could be adapted to adjust an element which does not necessarily rotate.

It will be evident also that the rod 5 must be provided either inside or outside the tube with a suitable friction brake or the like (not shown) so that it will be held in any operated position.

Figure 2:
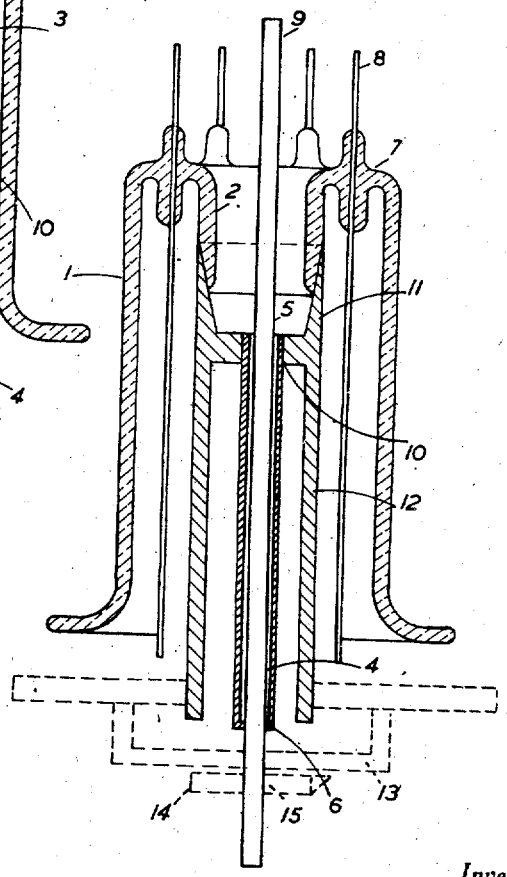
Figure 2 is a similar view of a modification of Figure 1.

Fig. 2 shows another form of the invention in which the torque is taken up entirely between the rod and the metal cup member sealed to the glass, so that the stem is relieved from all strain. In this case the cup member 11 is more heavily made, and has a downwardly extending hollow cylindrical portion 12 which forms the main support of the tube. The portion 12 may be secured in any way to a panel or other fixed part shown conventionally dotted at 13. This may carry a scale plate 14, and a pointer 15 may be attached to the rod 5 to indicate the angle of rotation on the scale. Any suitable like arrangement may obviously be used.

Although a circular cylindrical pipe 4 has been shown and described, it could have other cross sections or forms. For example, the pipe could be ribbed or fluted and have a cross section resembling a daisy or the like with a number of radial petals. Furthermore, if a pipe having this type of cross section be formed with a twist so that it becomes like a multiple helix, greater angles of twist become possible, combined at the same time with a longitudinal movement of the rod.

What is claimed is:

1. A sealed electronic tube having a glass stem portion, a rotatably adjustable sealed mounting for adjusting the position of an element coupled to said mounting within said tube comprising a flexible metal member having a sealed connection to the stem portion and a solid adjusting member extending through and sealed to the flexible member adjacent the outer end thereof, the flexible metal member having a thin circumferential wall portion torsionally deformable by rotation of the adjusting member to provide rotary adjustment of the mounting.

2. An adjustable mounting as set forth in claim 1, in which the metal member comprises a tubular metal element surrounding the solid adjusting member, mounted at one end on the glass stem portion and connected at the other end to the adjusting member.

3. A sealed electronic tube having a glass stem portion with a reentrant section, a rotatably adjustable sealed mounting comprising a flexible metal member having a sealed connection to said reentrant section of the stem portion, said member including a flexible tubular element, and an elongated solid adjusting member extending axially through said tubular element and sealed to said element adjacent the outer end thereof, the flexible member having a thin circumferential wall portion torsionally deformable by rotation of the adjusting member to provide rotary adjustment of the mounting.

4. A sealed electronic tube having a glass stem portion, an adjustable sealed mounting comprising a flexible metal member having a sealed connection to the stem portion, said member including a flexible tubular element, and an elongated solid adjusting member extending axially through said tubular element and sealed to said element adjacent the outer end thereof, said stem portion comprising a re-entrant central section and an annular dependent skirt sealed to said section, said flexible metal member having a sealed connection to said skirt.

5. A base construction for a sealed electronic tube comprising a glass stem portion and an adjustable sealed mounting including a flexible metal member having a sealed connection to the stem portion, said member including a cup-shaped support and a flexible tube connected at its inner end to said support, and an adjusting rod extending through said tube and sealed to the outer portion of the tube.

6. An adjustable mounting as set forth in claim 1 in which the flexible member comprises a torsionally deformable metal tube having side walls that are substantially straight and longitudinally incompressible in a direction parallel to the metal tube axis.

7. A base construction for a sealed electronic tube comprising a glass stem portion and an adjustable sealed mounting including a flexible metal member having a sealed connection to the stem portion, said member including a cup-shaped support having a dependent tube support mounted thereon and a flexible tube connected at its inner end to said cup-shaped support, and an adjusting rod extending through said flexible tube and sealed to the outer portion thereof.

CHRISTOPHER HENRY FOULKES.

REFERENCES CITED

The following references are of record in the file of this patent:

UNITED STATES PATENTS

| Number | Name | Date |
|---|---|---|
| Re. 21,361 | Gunn | Feb. 20, 1940 |